(12) United States Patent
Choi et al.

(10) Patent No.: US 11,226,000 B2
(45) Date of Patent: Jan. 18, 2022

(54) THRUST SUPPORTING APPARATUS

(71) Applicant: HANWHA POWERSYSTEMS CO., LTD, Changwon-si (KR)

(72) Inventors: Jong Won Choi, Changwon-si (KR); Sang Hyeon Park, Changwon-si (KR)

(73) Assignee: HANWHA POWERSYSTEMS CO., LTD, Changwon-si (KR)

( * ) Notice: Subject to any disclaimer, the term of this patent is extended or adjusted under 35 U.S.C. 154(b) by 0 days.

(21) Appl. No.: 16/728,441

(22) Filed: Dec. 27, 2019

(65) Prior Publication Data

US 2020/0332831 A1 Oct. 22, 2020

(30) Foreign Application Priority Data

Apr. 18, 2019 (KR) .................. 10-2019-0045244

(51) Int. Cl.
*F16C 17/04* (2006.01)
*F16C 27/08* (2006.01)

(52) U.S. Cl.
CPC ........ *F16C 17/042* (2013.01); *F05D 2240/52* (2013.01); *F16C 17/045* (2013.01); *F16C 27/08* (2013.01); *F16C 2300/22* (2013.01)

(58) Field of Classification Search
CPC ....... F16C 17/042; F16C 17/045; F16C 27/08
See application file for complete search history.

(56) References Cited

U.S. PATENT DOCUMENTS

| 4,699,525 A * | 10/1987 | Mizobuchi | .............. F16C 17/18 |
| | | | 384/369 |
| 4,872,808 A * | 10/1989 | Wilson | .................... F04D 13/10 |
| | | | 415/170.1 |
| 6,261,002 B1 | 7/2001 | Ermilov et al. | |
| 6,948,853 B2 * | 9/2005 | Agrawal | .............. F01D 25/168 |
| | | | 384/105 |
| 6,997,613 B2 | 2/2006 | Katou et al. | |
| 9,964,143 B2 | 5/2018 | Yoshino et al. | |
| 2004/0179759 A1 | 9/2004 | Katou et al. | |
| 2015/0362012 A1 | 12/2015 | Ermilov | |
| 2016/0356310 A1 | 12/2016 | Yoshino et al. | |
| 2018/0156267 A1 * | 6/2018 | Luo | ........................ F16C 17/042 |

FOREIGN PATENT DOCUMENTS

| JP | 2002-195257 A | 7/2002 |
| JP | 2004-270904 A | 9/2004 |
| JP | 4576746 B2 | 11/2010 |
| JP | 2014-70730 A | 4/2014 |
| JP | 2015-59629 A | 3/2015 |
| KR | 10-2017-0058083 A | 5/2017 |

* cited by examiner

*Primary Examiner* — James Pilkington
(74) *Attorney, Agent, or Firm* — Sughrue Mion, PLLC

(57) ABSTRACT

A thrust supporting apparatus includes: a thrust runner configured to rotate integrally with a shaft; and a foil thrust bearing supporting an axial load of the shaft, the axial load being transmitted from the thrust runner. The foil thrust bearing includes a top foil facing a first surface of the thrust runner, and the thrust runner comprises first one or more grooves formed on the first surface.

14 Claims, 13 Drawing Sheets

THRUST SUPPORTING APPARATUS

CROSS-REFERENCE TO THE RELATED APPLICATION

This non-provisional application claims priority under 35 U.S.C. § 119 to Korean Patent Application No. 10-2019-0045244 filed on Apr. 18, 2019 in the Korean Intellectual Property Office, the disclosure of which is incorporated herein by reference in its entirety.

BACKGROUND

1. Field

Apparatuses consistent with exemplary embodiments relate to a thrust supporting apparatus capable of preventing overheating of a thrust runner, and more particularly, to a thrust supporting apparatus in which a flow path of a cooling gas is formed in a thrust runner to cool the thrust runner.

2. Description of the Related Art

A bearing is a type of device that supports the load of a rotating shaft in a turbo device including a compressor, a pump, and a rotor such as a turbine and that facilitates the rotation of the rotor by minimizing the friction between the bearing itself and the rotary shaft. In particular, of different types of bearing, a thrust bearing is a type of bearing which supports the axial load of the rotary shaft.

The thrust bearing supports the axial load of the rotary shaft transmitted thereto through the thrust runner provided on the rotary shaft and rotating integrally with the rotary shaft. The thrust bearing is installed at the front and the rear of the thrust runner, and the thrust runner and the thrust bearing face each other.

A gas foil thrust bearing (hereinafter referred to as a "foil thrust bearing") forms a high-pressure air film, instead of an oil film, between the foil thrust bearing and the thrust runner to support the thrust of the rotary shaft.

FIG. 1 is a schematic view of a foil thrust bearing of the related art, and FIG. 2 is a side cross-sectional view illustrating a foil thrust bearing installed to face a thrust runner of the related art.

Referring to FIGS. 1 and 2, a foil thrust bearing 30 includes a top foil 33 at which an air layer between the foil thrust bearing 30 and a thrust runner 40 is formed, a supporting structure 32 which supports the top foil 33 from below the top foil 33, and a housing 31 below the supporting structure 32. The foil thrust bearing 30 is classified into a bump type or a leaf type. FIGS. 1 and 2 illustrate a bump-type foil thrust bearing 30.

The foil thrust bearing 30 supports the axial load of a rotary shaft 10 by forming a high-pressure air layer between the top foil 33 and the thrust runner 40. The foil thrust bearing 30 can provide excellent support for the rotary shaft 10 as compared to a ball bearing that uses an oil film instead of the gas film. Thus, the foil thrust bearing 30 are typically used in a turbo machine rotating at high speed in the related art.

However, because the thrust runner 40 rotates at high speed together with the rotary shaft 10, the thrust runner 40 can be easily heated during the rotation of the rotary shaft 10. As the temperature of the thrust runner 40 rises, damage of the bearing 30, which is installed adjacent to the thrust runner 40, may be caused, which may lead to many serious problems that hamper the normal operation of the turbo device including the bearing 30.

Accordingly, in order to cool the thrust runner 40 more effectively, a turbo device of the related art may additionally be equipped with an apparatus for injecting a separate cooling gas, or a flow path of a cooling gas may be formed in a base plate of the foil thrust bearing 30.

However, the incorporation of a separate cooling device in the turbo device results in a cost increase, and the formation of a flow path of a cooling gas in the base plate has a relatively low cooling efficiency to cool the thrust runner 40.

SUMMARY

Exemplary embodiments of the disclosure provide a thrust supporting apparatus capable of preventing overheating of a thrust runner without the installation of additional cooling equipment in a turbo device.

However, exemplary embodiments of the disclosure are not restricted to those set forth herein. The above and/or other exemplary embodiments of the disclosure will become more apparent to one of ordinary skill in the art to which the present disclosure pertains by referencing the detailed description of the present disclosure given below.

According to an aspect of an exemplary embodiment, there is provided a thrust supporting apparatus including: a thrust runner configured to rotate integrally with a shaft; and a foil thrust bearing supporting an axial load of the shaft, the axial load being transmitted from the thrust runner. The foil thrust bearing includes a top foil facing a first surface of the thrust runner, and the thrust runner comprises first one or more grooves formed on the first surface.

The first one or more grooves are formed as spirals.

The first one or more grooves are curved from an inner portion to an outer portion of the thrust runner in a radial direction of the shaft in an opposite direction of a rotational direction of the thrust runner.

The first one or more grooves are formed as straight lines.

The first one or more grooves formed as the straight lines extend along a radial direction of the thrust runner in a direction opposite to a rotational direction of the thrust runner.

The thrust supporting apparatus further includes an additional foil thrust bearing. The additional foil thrust bearing includes a top foil disposed to a second surface opposite to the first surface of the thrust runner in an axial direction of the shaft. The second surface comprises second one or more grooves formed on the second surface of the thrust runner, and first extending directions of the first one or more grooves formed on the first surface of the thrust runner match second extending directions of the second one or more grooves formed on the second surface of the thrust runner.

A cross section of each of the first one or more grooves has at least one of a semicircular shape, a square shape, and a triangular shape.

Openings which do not overlap with the top foil are formed at opposite ends of each of the first one or more grooves.

The top foil is provided a predetermined distance apart radially from an inner diameter of the thrust runner, and inner ends of the grooves are disposed between the top foil and the inner diameter of the thrust runner.

The first one or more grooves extend to an outer diameter of the thrust runner so that outer ends of the grooves are disposed on an outer circumferential surface of the thrust runner.

According to an aspect of another exemplary embodiment, there is provided a thrust supporting apparatus including: a thrust runner configured to rotate integrally with a shaft and including: a first surface facing an impeller; and a second surface opposite to the first surface of the thrust runner; and foil thrust bearings supporting an axial load of the shaft being transmitted through the thrust runner and including: a first foil thrust bearing including a first top foil facing the first surface; and a second foil thrust bearing including a second top foil facing the second surface. The thrust runner further includes: first grooves formed on the first surface; and second grooves form on the second surface.

The first grooves and the second grooves are curved from an inner portion to an outer portion of the thrust runner in a radial direction of the shaft in an opposite direction of a rotational direction of the thrust runner.

The first grooves and the second grooves extend in straight lines from an inner portion to an outer portion of the thrust runner in a radial direction of the shaft in an opposite direction of a rotational direction of the thrust runner.

A cross section of each of the first grooves and each of second grooves has at least one of a semicircular shape, a square shape, and a triangular shape.

According to the aforementioned and other exemplary embodiments of the present disclosure, a thrust runner can be effectively cooled without the installation of additional cooling equipment.

Other features and other exemplary embodiments may be apparent from the following detailed description, the drawings, and the claims.

BRIEF DESCRIPTION OF THE DRAWINGS

The above and/or other exemplary embodiments and features of the disclosure will become more apparent by describing in detail exemplary embodiments thereof with reference to the attached drawings, in which.

DETAILED DESCRIPTION

Figure 1:
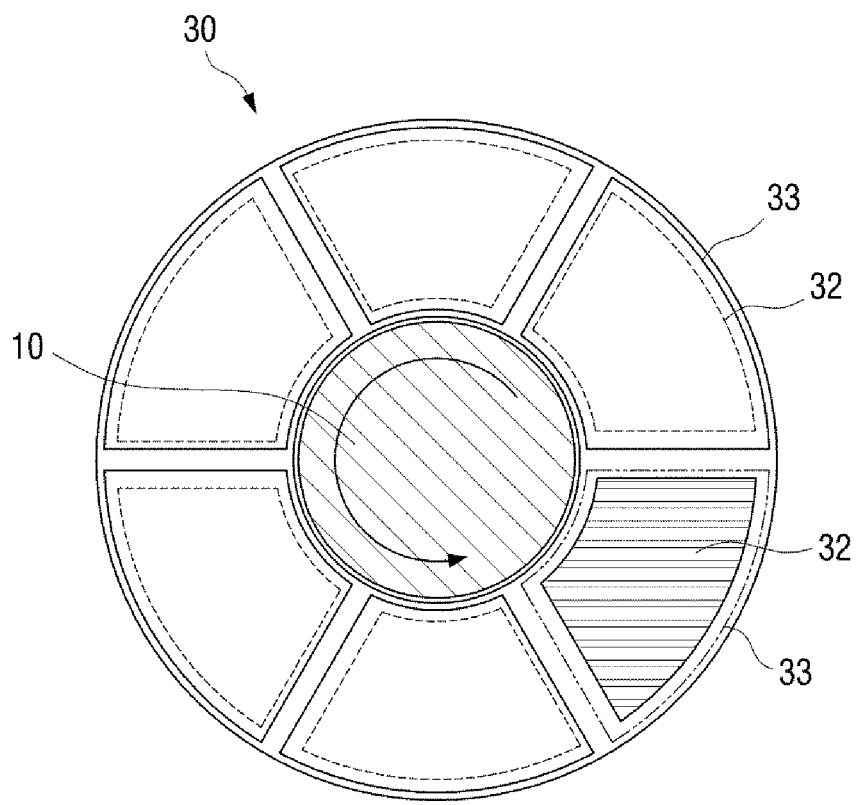
FIG. 1 is a schematic view of a foil thrust bearing of the related art.
Figure 2:
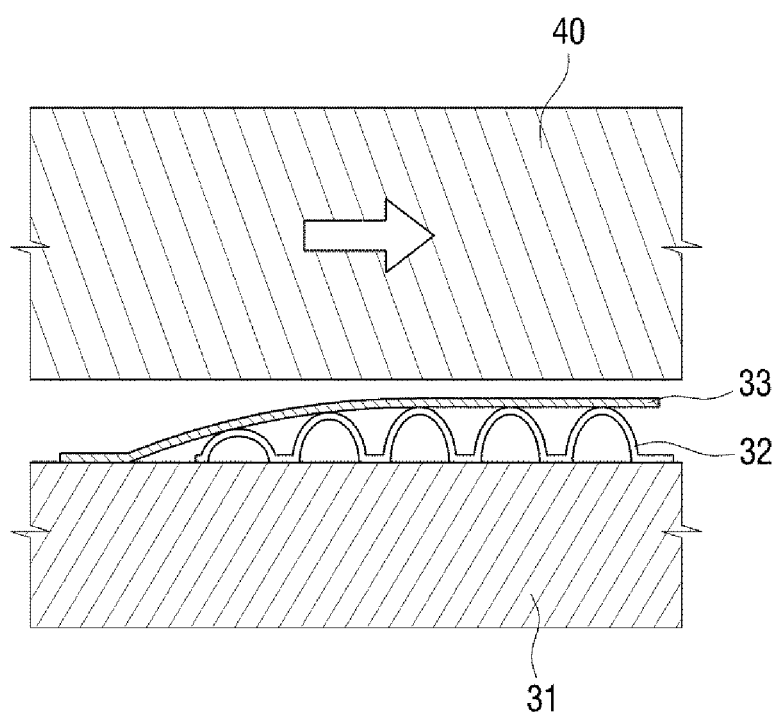
FIG. 2 is a side cross-sectional view illustrating a foil thrust bearing installed to face a thrust runner of the related art.

Advantages and features of the disclosure and methods of accomplishing the same may be understood more readily by reference to the following detailed description of exemplary embodiments and the accompanying drawings. The disclosure may, however, be embodied in many different forms and should not be construed as being limited to the embodiments set forth herein. Rather, these exemplary embodiments are provided so that this disclosure will be thorough and complete and will fully convey the concept of the disclosure to those skilled in the art, and the disclosure will only be defined within the scope of the appended claims. In the drawings, like reference numerals indicate like elements.

Unless otherwise defined, all terms (including technical and scientific terms) used herein have the same meaning as commonly understood by one of ordinary skill in the art to which the present invention belongs. It will be further understood that terms, such as those defined in commonly used dictionaries, should be interpreted as having a meaning that is consistent with their meaning in the context of the relevant art and this specification and will not be interpreted in an idealized or overly formal sense unless expressly so defined herein.

In the following description of the present disclosure, the terms used are for explaining exemplary embodiments of the disclosure, but do not limit the scope of the present disclosure. In the description, a singular expression may include a plural expression unless specially described. The term "comprises" and/or "comprising" used in the description means that one or more other components, steps, operation and/or existence or addition of elements are not excluded in addition to the described components, steps, operation and/or elements. Further, the term "and/or" includes each of mentioned items and all combinations of one or more of the items.

Exemplary embodiments of the disclosure will hereinafter be described with reference to the accompanying drawings.

Figure 3:
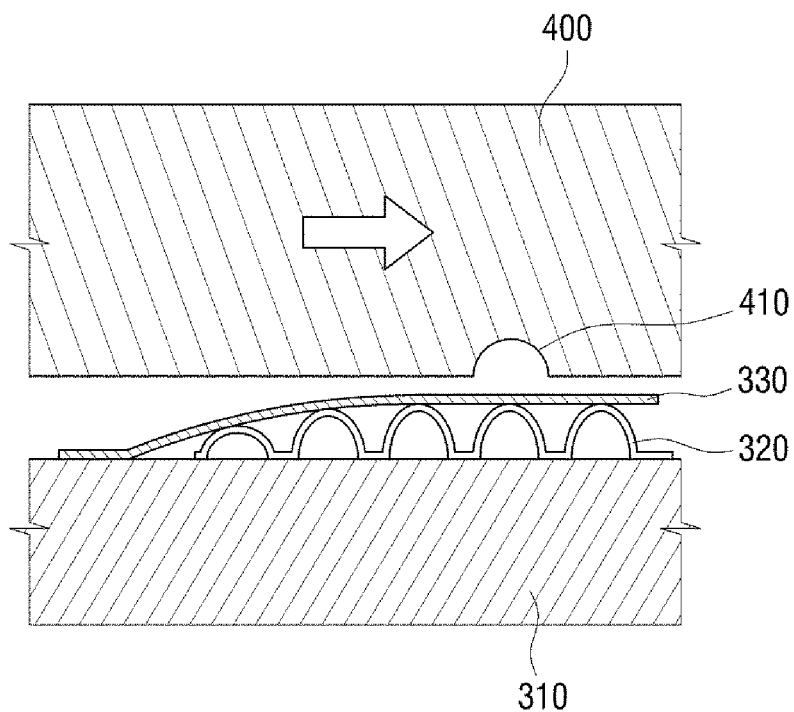
FIG. 3 is a side view of a thrust supporting apparatus according to an exemplary embodiment.
Figure 4:
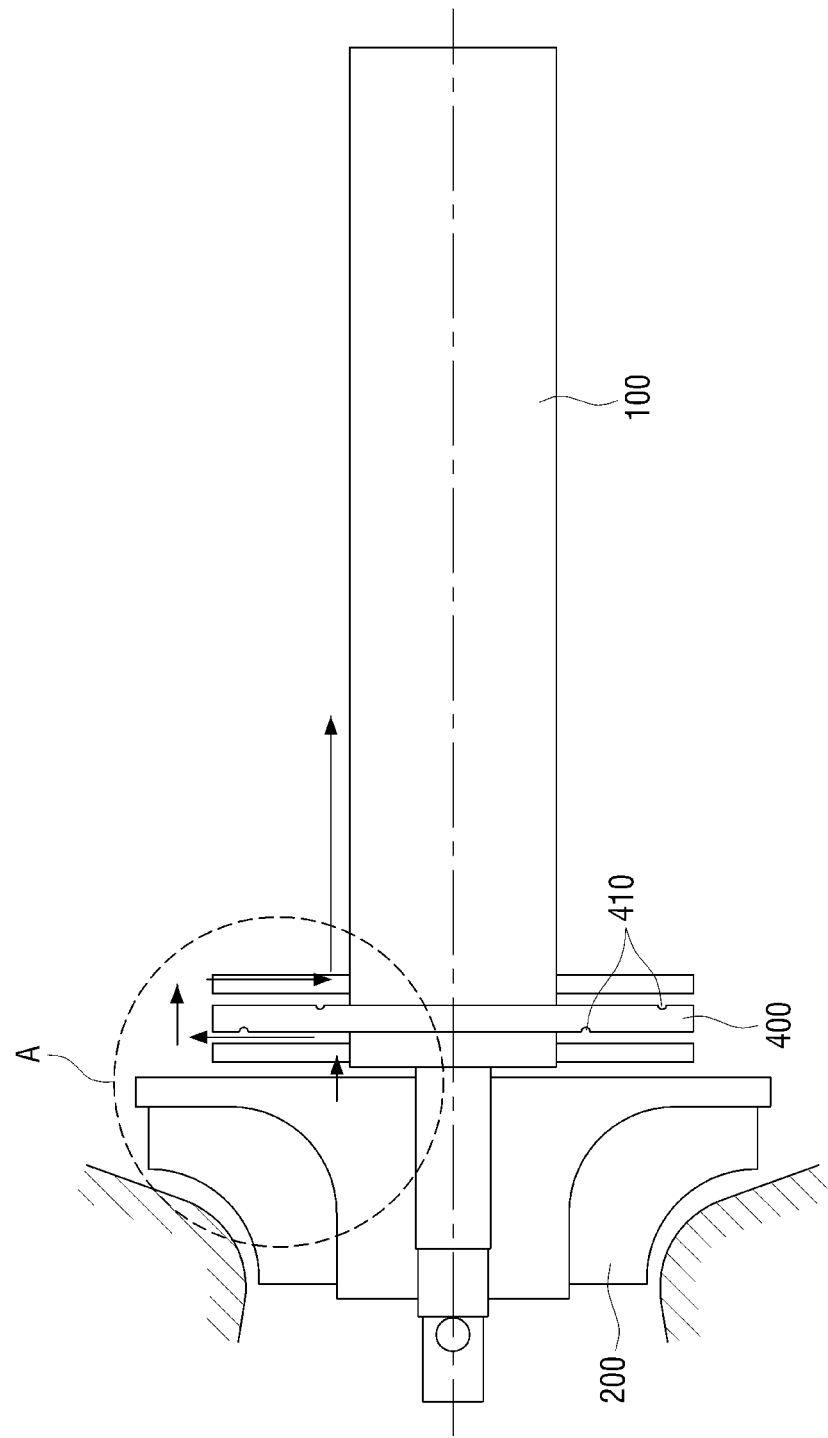
FIGS. 4 and 5 are schematic views illustrating the flow of a fluid when the thrust supporting apparatus of FIG. 3 is installed at the rear of an impeller according to an exemplary embodiment.
Figure 5:
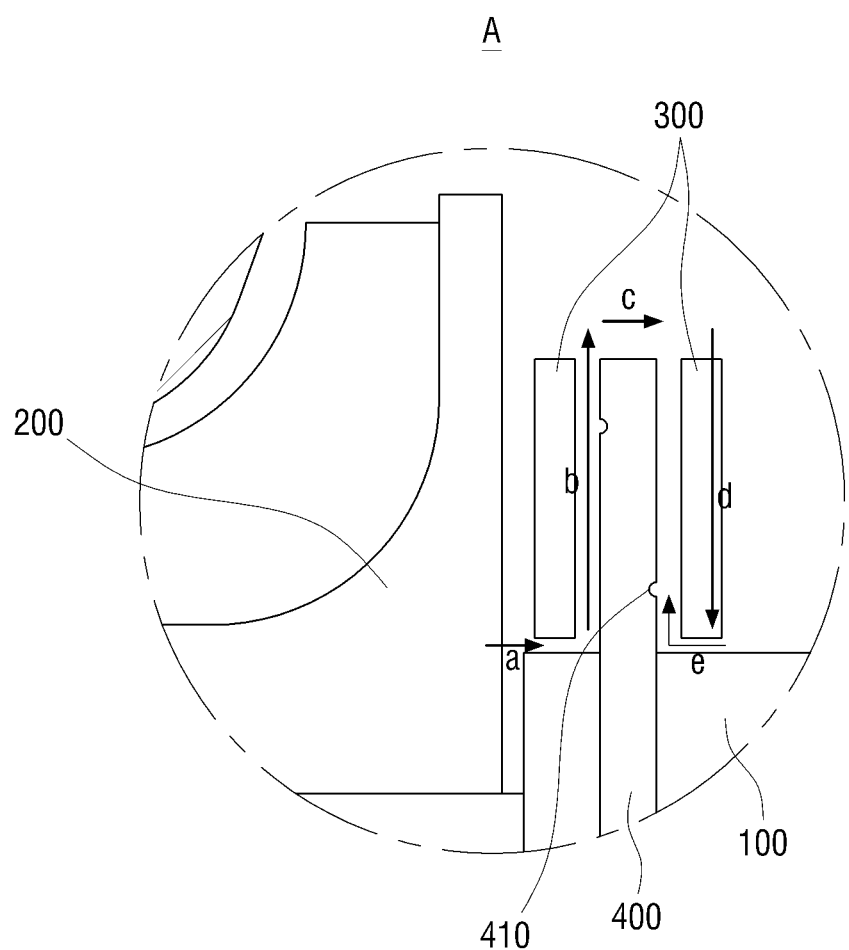

FIG. 3 is a side view of a thrust supporting apparatus according to an embodiment, and FIGS. 4 and 5 are schematic views illustrating the flow of a fluid when the thrust supporting apparatus of FIG. 3 is installed at the rear of an impeller according to an embodiment.

Referring to FIGS. 3 through 5, the thrust supporting apparatus includes a thrust runner 400 which rotates integrally with a shaft 100 and foil thrust bearings 300 which support the axial load of the shaft 100, each of the foil thrust bearings 300 includes a top foil 330 which is disposed to face a surface of a thrust runner 400, and one or more grooves 410 in which a cooling gas can flow may be formed on the surface of the thrust runner 400 that faces the top foil 330.

The shaft 100 is connected to an impeller 200 to rotate at high speed and includes the thrust runner 400. The thrust runner 400 is in the shape of a disk formed in the radial direction of the shaft 100, and the shaft 100 penetrates the center of the thrust runner 400, which is provided on an outer surface of the shaft 100. The thrust runner 400 rotates integrally with the shaft 100 and transmits the axial load applied to the shaft 100 to the foil thrust bearings 300 provided on each side of the thrust runner 400.

In order to support the axial load of the shaft 100, the foil thrust bearings 300 are installed at the front and rear surfaces of the thrust runner 400. However, the exemplary embodiment is not limited thereto. For example, the foil thrust bearings 300 may be installed on only one of the front and rear surfaces of the thrust runner 400 depending on the structure of a turbo device. In the description that follows, it is assumed that the foil thrust bearings 300 are installed at both the front and rear surfaces of the thrust runner 400, but the present disclosure does not exclude a case where the thrust supporting apparatus includes a single foil thrust bearing 300 supporting the thrust runner 400.

The thrust bearings 300 are installed to face the thrust runner 400 in an axial direction of the shaft 100, and oil films or air films are formed between the thrust runner 400 and the thrust bearings 300. The oil films or the air films support the axial load of the shaft 100 transmitted through the thrust runner 400.

The thrust supporting apparatus may include the foil thrust bearings 300, which are for supporting axial load. The foil thrust bearings 300, which are a type of gas bearing, form gas films between each of the foil thrust bearings 300 and the thrust runner 400 to support the thrust runner 400.

The foil thrust bearings 300 are classified into a bump type or a leaf type.

In a bump-type foil thrust bearing 300, a base plate which becomes an installation part for each component in a housing 310 is disposed, a bump-type foil 320 which is in the corrugated form is installed on the base plate, and a top foil 330 is installed on the bump-type foil 320. As the bump-type foil thrust bearing 300 is assembled to the shaft 100 to face the thrust runner 400, the top foil 330 and the thrust runner 400 face each other. When the thrust runner 400 rotates at high speed, a high-pressure air layer is formed between the top foil 330 and the thrust runner 400 so that the bump-type foil thrust bearing 300 can support the axial load of the shaft 100.

A gas film between the top foil 330 and the thrust runner 400 not only supports the axial load of the shaft 100, but also cools the thrust runner 400, which generates heat by rotating at high speed with the shaft 100. As the gas film becomes thicker, the cooling effect of the gas film can be improved, but the gas film may not be able to secure sufficient pressure and thus may not be able to properly support the axial load of the shaft 100. Thus, a clearance greater than a predetermined level between the thrust runner 400 and the thrust bearing 300 cannot effectively support the axial load of the shaft 100.

The cooling efficiency of a gas that is in direct contact with the thrust runner 400, i.e., a gas that flows between the top foil 330 and the thrust runner 400, is high, but the amount of flow of the gas is small because of the limited clearance between the thrust runner 400 and the thrust bearing 300. That is, in order to secure high pressure to support the axial load of the thrust runner 400, a thin gas film needs to be formed between the thrust runner 400 and the thrust bearing 300. On the contrary, the amount of flow of a gas that flows under the top foil 330, particularly, between the bumps of the bump-type foil 320, is large in comparison, but the cooling efficiency of this gas is low because the gas does not make direct contact with the thrust runner 400. Thus, it may be preferable to increase the amount of flow of the gas that flows above the top foil 330 (between the top foil 330 and the thrust runner 400) to prevent overheating of the thrust runner 400. To this end, one or more grooves 410 may be formed on the front or rear surface of the thrust runner 400 that faces the top foil 330, thereby increasing the amount of flow of the gas that is in direct contact with the thrust runner 400. For clarity, a surface of the thrust runner 400 that faces the impeller 200 will hereinafter be referred to as the front surface of the thrust runner 400, and a surface of the thrust runner 400 that is opposite to the front surface of the thrust runner 400 facing the impeller 200 will hereinafter be referred to as the rear surface of the thrust runner 400.

In a leaf-type foil thrust bearing 300, a plurality of top foils are installed on a base plate to overlap with one another, a leaf spring is installed between the top foils and the base plate, and a high-pressure gas film is formed between the top foils and the thrust runner 400 to support the axial load of the shaft 100. In the leaf-type foil thrust bearing 300, like in the bump-type foil thrust bearing 300, a space can be secured between the top foils overlapping with one another, and as a result, a relatively large amount of gas can be flown below the top foils. On the contrary, in order to generate appropriate pressure for supporting the thrust runner 400, only a relatively small amount of gas can be flown above the top foils (between the top foils and the thrust runner facing the top foils). Accordingly, in the case of the leaf-type foil thrust bearing 300, like in the case of the bump-type foil thrust bearing 300, the amount of gas flown above the top foils needs to be increased to provide a better cooling effect for the thrust runner 400. The thrust supporting apparatus may include both the bump-type foil thrust bearing 300 and the leaf-type foil thrust bearing 300.

Referring to FIGS. 4 and 5, the flow of a fluid at the front or the rear of the thrust runner 400 may be formed in a direction from the inner portion to the outer portion of the thrust runner 400 in a radial direction of the shaft 100. Specifically, in response to a high-pressure gas being released from the rear of the impeller 200 and moving in a direction "a" along the shaft 100 to arrive at the front of the thrust runner 400, the high-pressure gas may move in a direction "b" from the inner portion to the outer portion of the thrust runner 400 in the radial direction, at the front of the thrust runner 400. Then, the high-pressure gas may move in a direction "c" in the axial direction of the shaft 100 along the side of the thrust runner 400 to arrive at the rear of the thrust runner 400. Then, the high-pressure gas flows in a direction "d" toward the inner portion of the thrust runner 400 through the gaps between the base plate and the top foil 330 of the foil thrust bearing 300 installed at the rear of the thrust runner 400. Then, some of the high-pressure gas moves backward in a direction "e" to the rear surface of the thrust runner 400 along the shaft 100 to flow in the direction from the inner portion to the outer portion of the thrust runner 400 in the radial direction, along the rear surface of the thrust runner 400, while the rest of the high-pressure gas moves along the shaft 100 in the axial direction away from the thrust runner 400.

Gases flow in the directions "b" and "e" from the inner portion to the outer portion of the thrust runner 400 in the radial direction, at the front and the rear surfaces of the thrust runner 400. The grooves 410 of the thrust runner 400 may be formed in a shape that can minimize the resistance against the flow of the cooling gas in accordance with the rotational direction of the thrust runner 400 when the cooling gas flows from the internal diameter to the external diameter of the thrust runner 400 along the grooves 410 of the thrust runner 400.

The shape of the grooves 410 of the thrust runner 400 will hereinafter be described.

Figure 6:
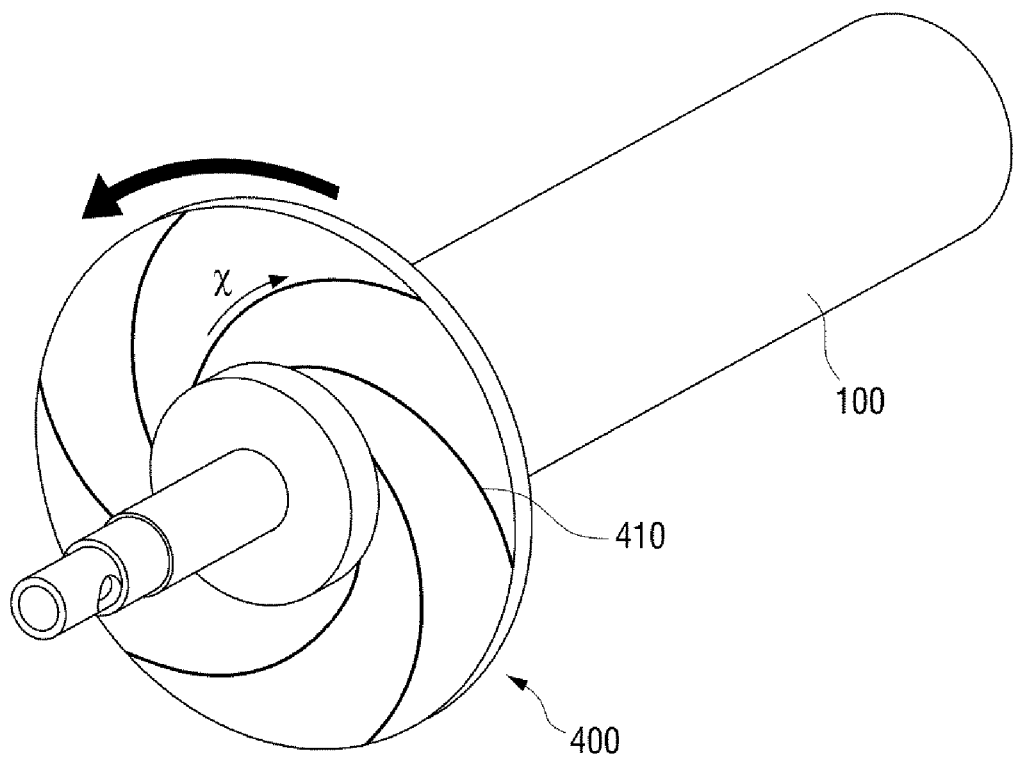
FIG. 6 is a perspective view of a thrust runner according to an exemplary embodiment.
Figure 7:
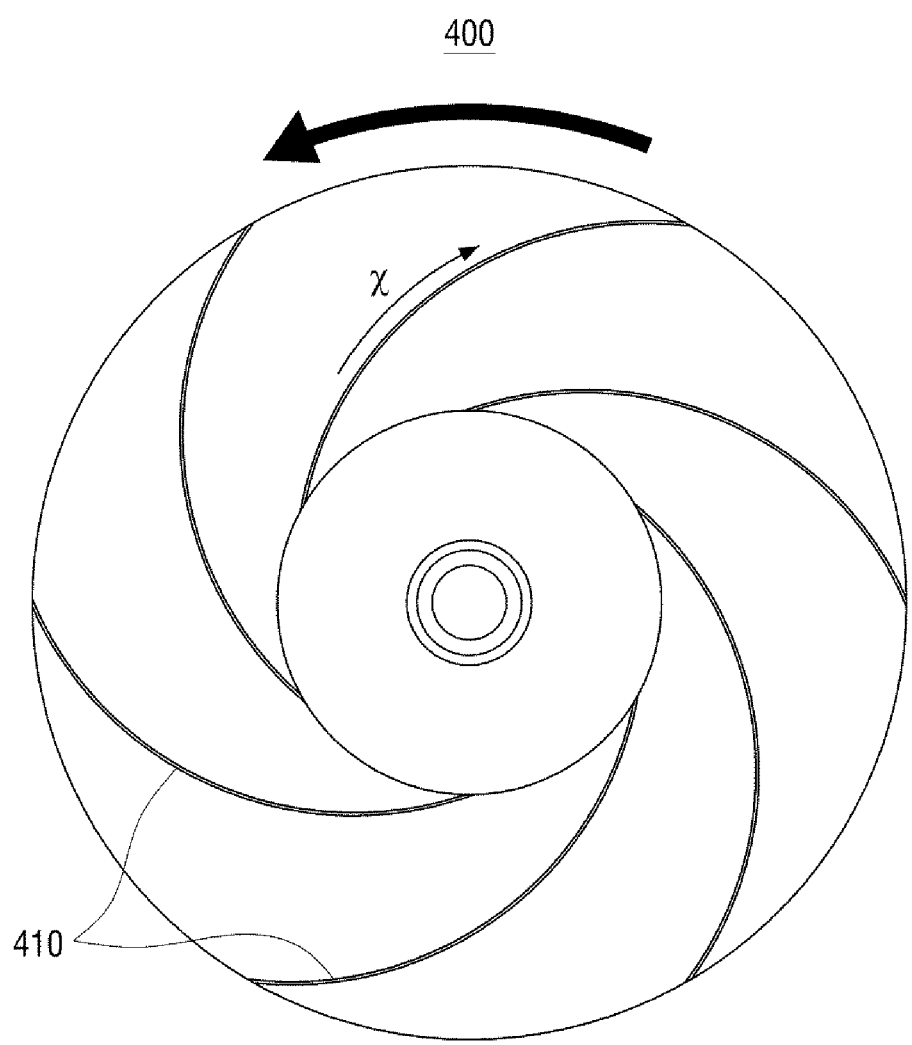
FIG. 7 is a front view of the thrust runner of FIG. 6 according to an exemplary embodiment.
Figure 8:
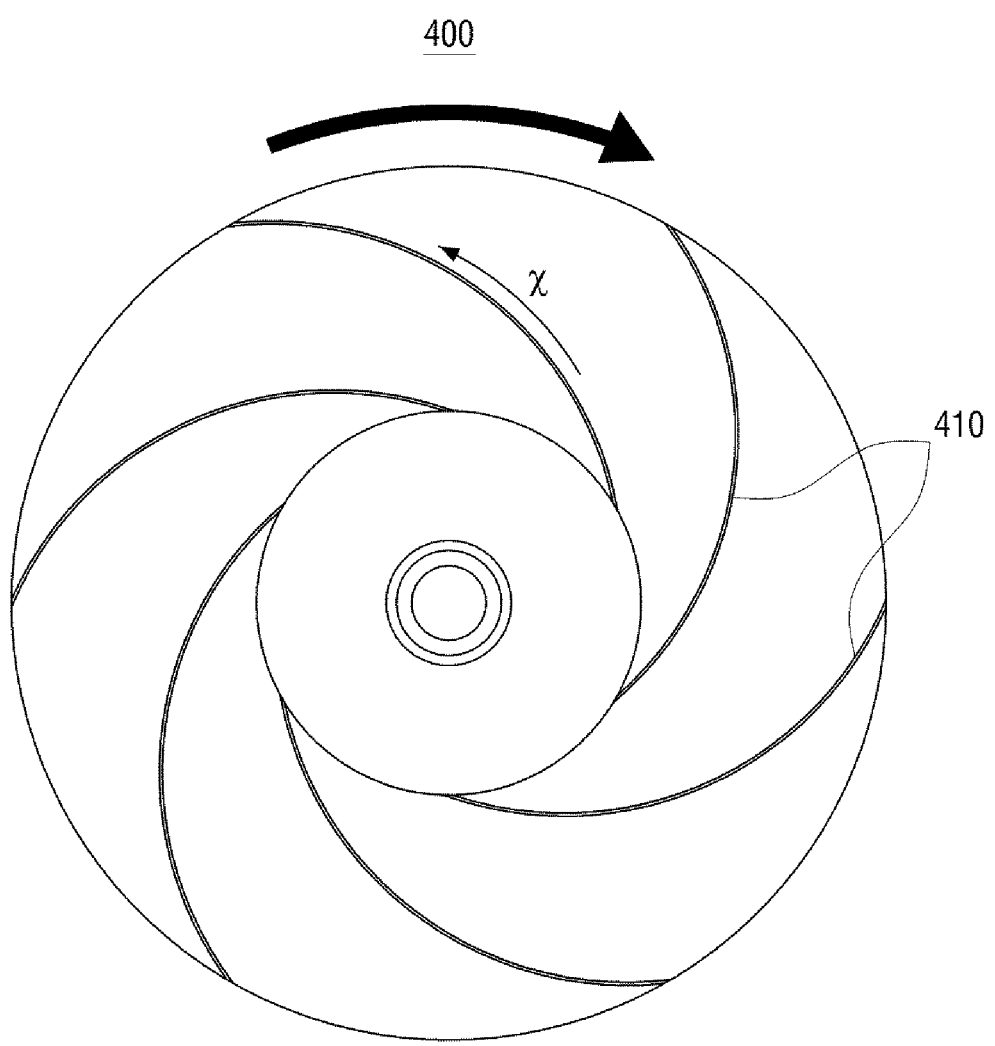
FIG. 8 is a rear view of the thrust runner of FIG. 6 according to an exemplary embodiment.
Figure 9:
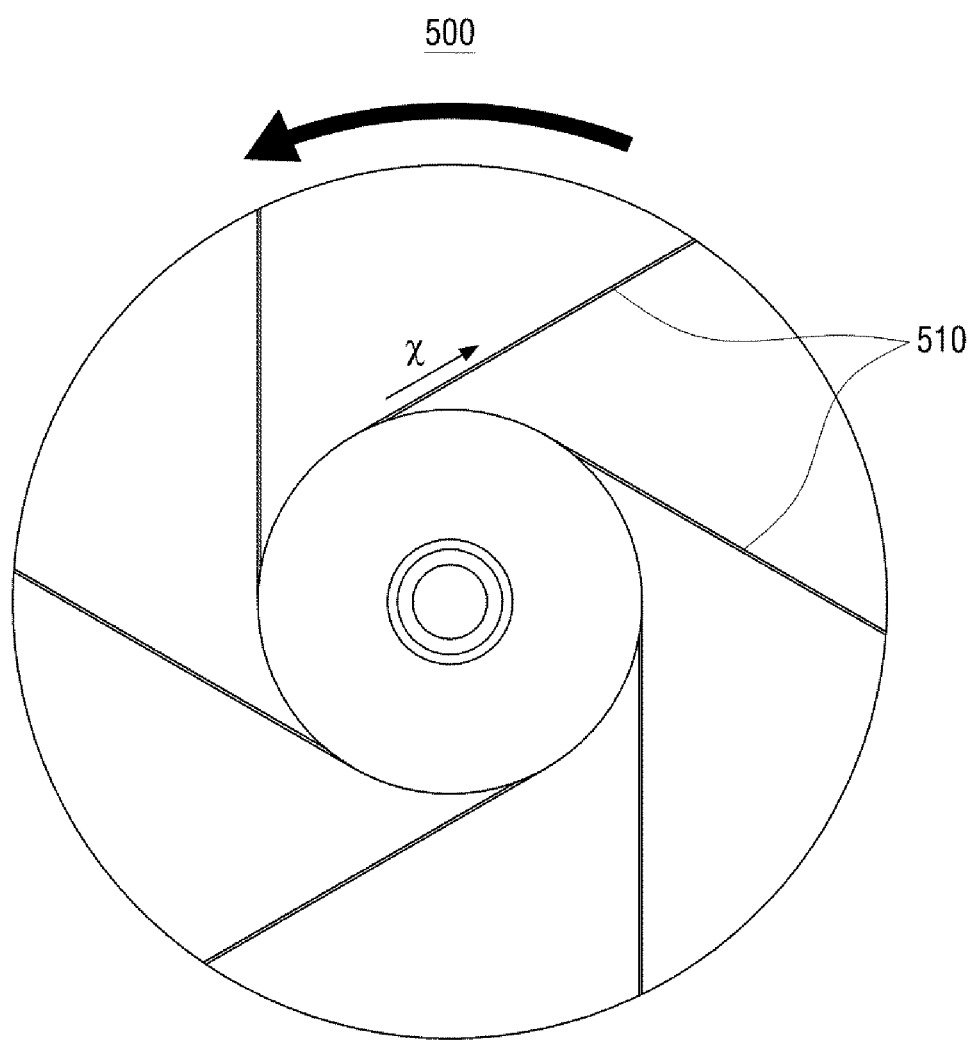
FIG. 9 is a front view of a thrust runner according to another exemplary embodiment.

FIG. 6 is a perspective view of a thrust runner according to an exemplary embodiment, FIG. 7 is a front view of the thrust runner of FIG. 6 according to an exemplary embodiment, FIG. 8 is a rear view of the thrust runner of FIG. 6 according to an exemplary embodiment, and FIG. 9 is a front view of a thrust runner according to another exemplary embodiment.

Referring to FIGS. 6 through 8, one or more grooves 410 may be formed on a thrust runner 400 as spirals extending radially from the center portion of the thrust runner 400 to the outer portion of the thrust runner 400. The grooves 410 may be curved in a direction opposite to the rotational direction of the thrust runner 400, e.g., in a direction "x", to minimize the resistance against the flow of the cooling gas.

In a case where the thrust runner rotates counterclockwise, as illustrated in FIGS. 6 and 7, the grooves 410 may be curved in a direction from the inner portion to the outer portion of the thrust runner 400 in the radial direction in a clockwise direction from the inner portion to the outer portion of the thrust runner 400 in the radial direction. As already mentioned above, a gas that flows along the front and rear surfaces of the thrust runner 400 may be introduced from the inner portion of the thrust runner 400 to move toward the outer portion of the thrust runner 400. If the grooves 410 are formed in the opposite direction to the rotational direction of the thrust runner 400, the resistance against the flow of a gas in the grooves 410 can be minimized. However, if the grooves 410 are formed in the same direction as the rotational direction of the thrust runner 400, the resistance against the flow of the cooling gas may increase, and as a result, the amount of the cooling gas that can be secured may be reduced.

The shape of grooves 410 formed on the front surface of the thrust runner 400 may correspond to the shape of grooves 410 formed on the rear surface of the thrust runner 400. FIG. 8 is a perspective view of the thrust runner 400 of FIG. 6 according to an exemplary embodiment, as viewed from the rear thereof. As viewed from the front of the thrust runner 400, the thrust runner 400 rotates counterclockwise as shown in FIG. 7. As viewed from the rear of the thrust runner 400 as shown in FIG. 8, the thrust runner 400 rotates clockwise. If the thrust runner 400 rotates clockwise, grooves 410 may be formed as spirals that are curved in a counterclockwise direction from the internal diameter to the external diameter of the thrust runner 400, and as a result, the resistance against the flow of the cooling gas that moves on the inside of the grooves 410 can be minimized. Accordingly, as viewed from the front of the thrust runner 400, grooves 410 may be formed on the rear surface of the thrust runner 400 as spirals that are curved in the same direction as the grooves 410 formed on the front surface of the thrust runner 400. As already mentioned above, because the cooling gas flows in the same direction (i.e., in the direction from the internal diameter to the external diameter of the thrust runner 400) on both the front and rear surfaces of the thrust runner 400 and the front and rear surfaces of the thrust runner 400 rotate integrally, the direction in which to form the grooves 410 to minimize the resistance against the flow of the cooling gas is the same on both the front and rear surfaces of the thrust runner 400.

Referring to FIG. 9, grooves 510 of a thrust runner 500 according to another exemplary embodiment of the present disclosure may be formed as straight lines instead of curved lines as shown in FIG. 6-8. The grooves 510, like the grooves 410, which are formed as curves, need to be formed in a direction that can minimize the resistance against the flow of the cooling gas in consideration of the rotational direction of the thrust runner 500. If the thrust runner 500 rotates counterclockwise, the grooves 510 may be formed as slanting lines so that the cooling gas can flow in the opposite direction of the rotational direction of the thrust runner 500 when moving on the inside of the grooves 510 in a direction from the internal diameter to the external diameter of the thrust runner 500. Specifically, the grooves 510 may be formed as straight lines obtained by rotating radial lines clockwise.

The grooves 410 or 510 are not particularly limited to being spirals or straight lines and may be formed in various other shapes that can maximize the efficiency of cooling the thrust runner 400 while minimizing the loss of the average surface pressure of a gas film formed between the thrust runner 400 or 500 and the top foils 330 of the foil thrust bearings 300.

Referring again to FIG. 3, the grooves 410, which are formed on the thrust runner 400, may have a semicircular cross-sectional shape. The cross-sectional shape of the grooves 410 is not particularly limited as long as deformation is not caused by stress generated when the thrust runner 400 rotates. Alternatively, the grooves 410 may be formed to have a triangular or rectangular cross-sectional shape.

Figure 10:
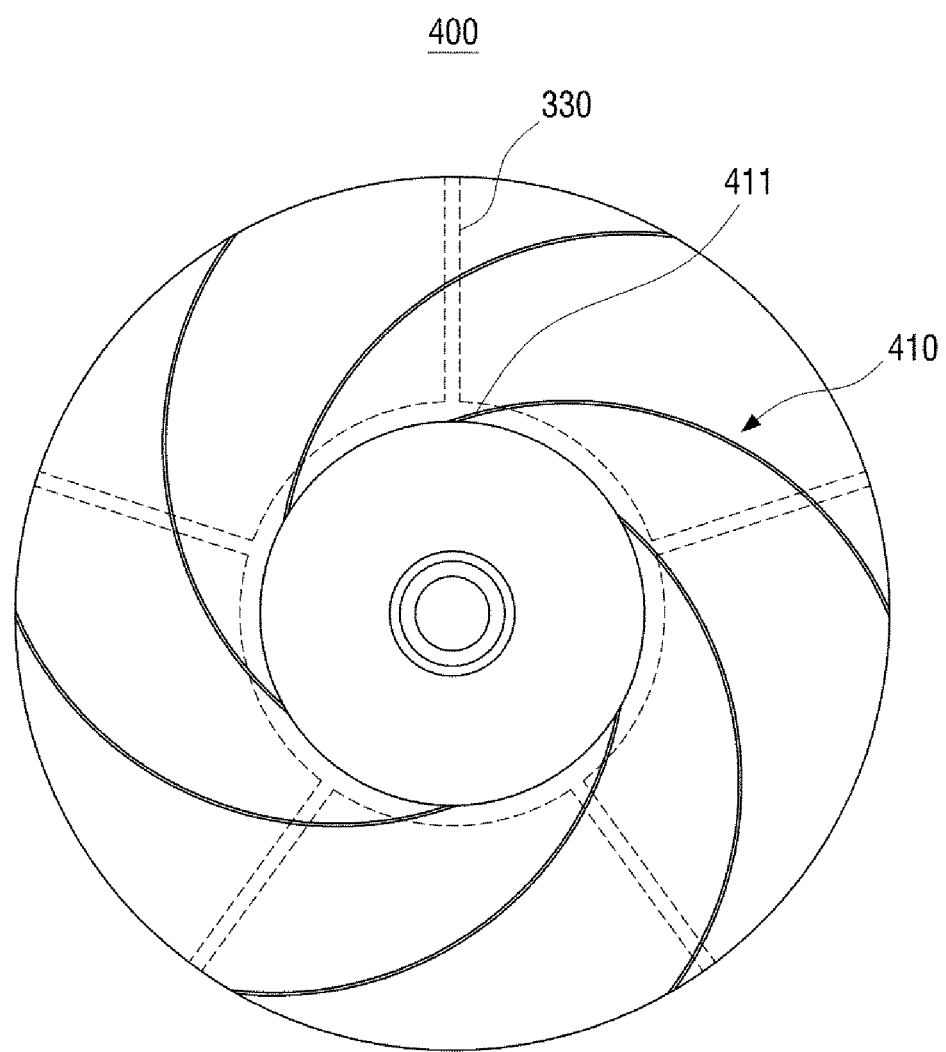
FIG. 10 is a front view of the thrust runner of FIG. 6 according to an exemplary embodiment.
Figure 11:
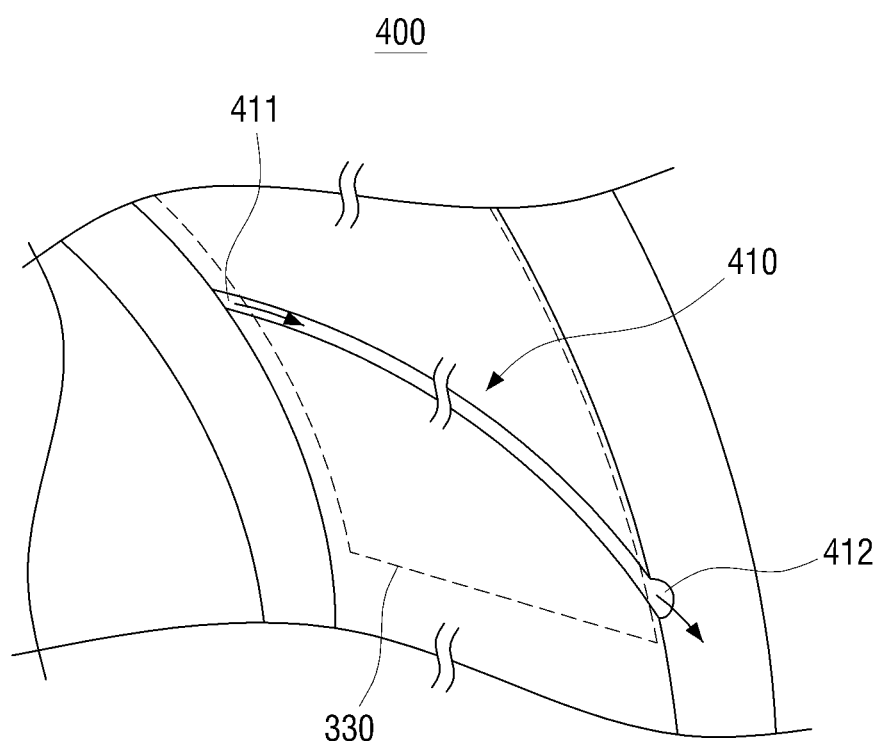
FIG. 11 is an enlarged perspective view illustrating openings of a groove of FIG. 10 according to an exemplary embodiment.
Figure 12:
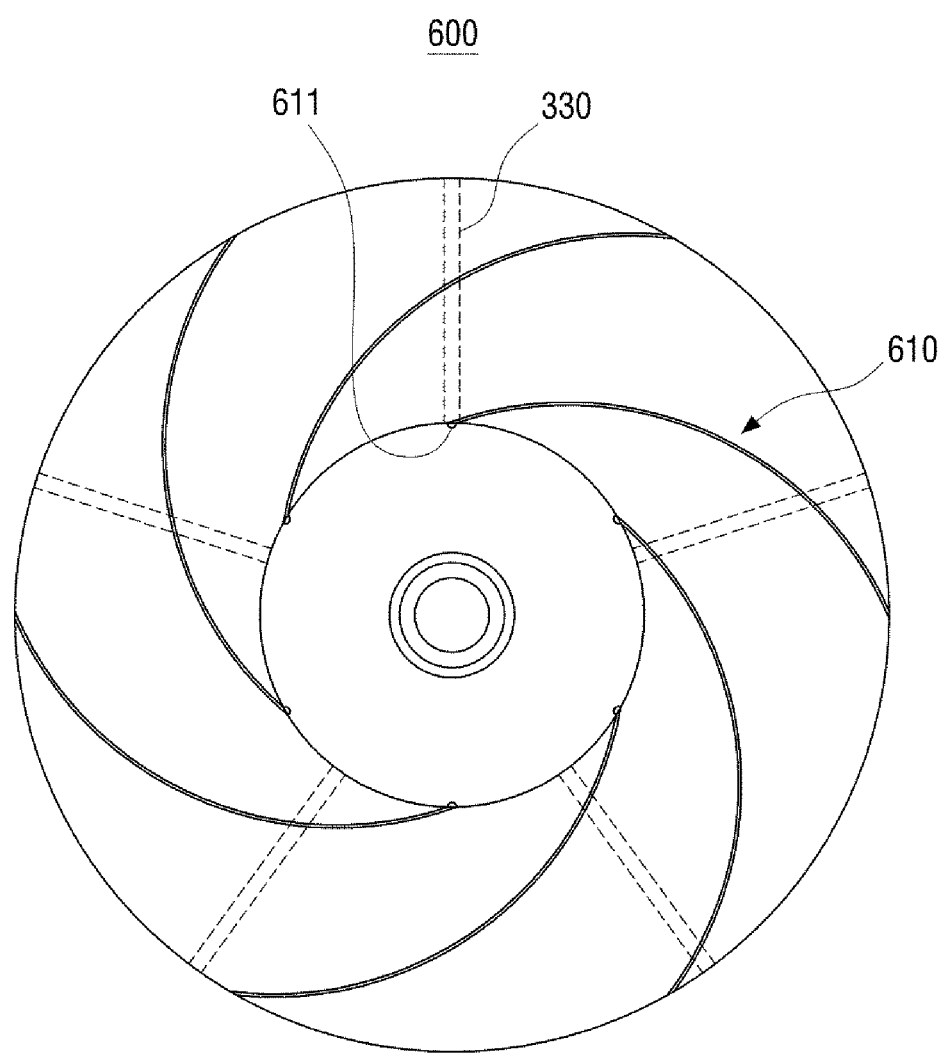
FIG. 12 is a front view of a thrust runner according to another exemplary embodiment.
Figure 13:
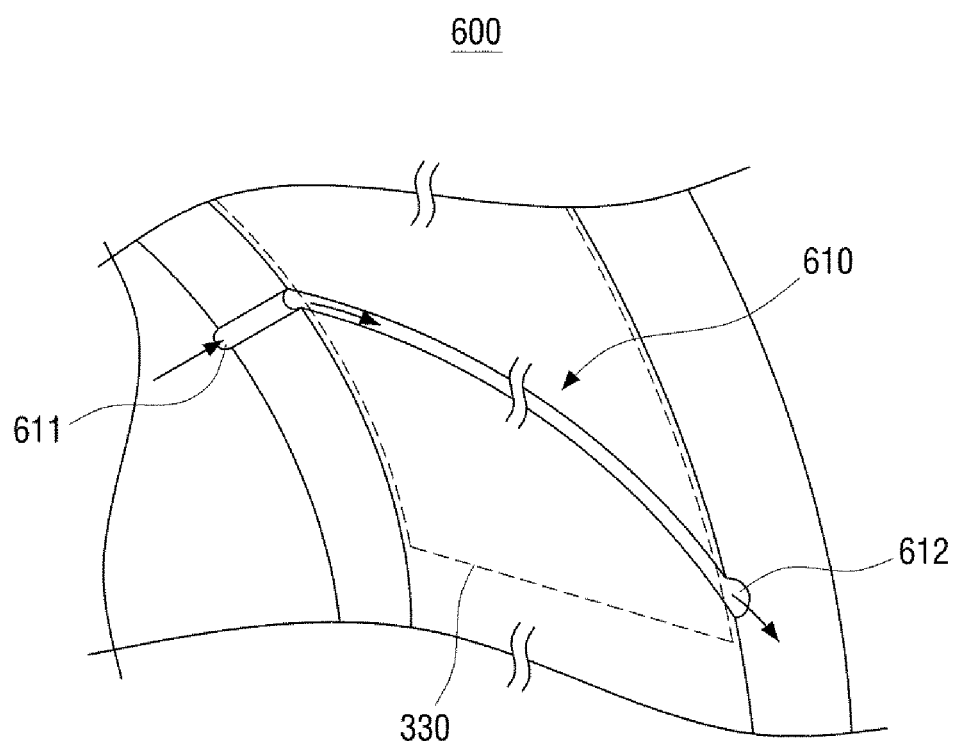
FIG. 13 is an enlarged perspective view illustrating openings of a groove of FIG. 12 according to an exemplary embodiment.

FIG. 10 is a front view of the thrust runner of FIG. 6 according to an exemplary embodiment. FIG. 11 is an enlarged perspective view illustrating openings of a groove of FIG. 10 according to an exemplary embodiment. FIG. 12 is a front view of a thrust runner according to another exemplary embodiment. FIG. 13 is an enlarged perspective view illustrating openings of a groove of FIG. 12 according to an exemplary embodiment.

As already mentioned above, the cooling gas moving along the grooves 410 of the thrust runner 400 is released from the internal diameter to the external diameter of the thrust runner 400. The cooling gas can continue to flow in and out of the grooves 410 only if the inlets and the outlets of the grooves 410 are open. Specifically, a first end 411 of a groove 410 on the side of the internal diameter of the thrust runner 400 needs to be open to allow the cooling gas to flow into the groove 410, and a second end 412 of the groove 410 on the side of the external diameter of the thrust runner 400 needs to be open to properly release the cooling gas therefrom and to allow the cooling gas to keep flowing into the groove 410. In order to ensure a smooth flow of the cooling gas that passes through the inside of the grooves 410, each of the grooves 410 may be provided with openings (411 and 412) at both ends thereof.

Before the installation of the foil thrust bearings 300, the grooves 410 formed on the front surface of the thrust runner 400 may be open at the front of the thrust runner 400, and the grooves 410 formed on the rear surface of the thrust runner 400 may be open at the rear of the thrust runner 400. However, once the foil thrust bearings 300 are installed at the front and the rear of the thrust runner 400 and the shaft and the thrust runner 400 begin to rotate, the top foils 330 of the foil thrust bearings 300 are pressed against the top and the rear of the thrust runner 400. Even though the top foils 330 of the foil thrust bearings 300 are not in physical contact with the thrust runner 400, the cooling gas may not be able to properly flow in and out of the gap between the thrust runner 400 and the top foils 330 of the foil thrust bearings 300, particularly, in regions where the top foils 330 of the foil thrust bearings 300 overlap with the thrust runner 400. In order to address this problem, the openings (411 and 412) are formed at parts of each of the grooves 410 that do not overlap with the top foils 330 of the foil thrust bearings 300, so that inlets and outlets for the cooling gas can be secured.

Referring to FIGS. 10 and 11, the top foils 330 of the foil thrust bearings 300 are installed to be a predetermined distance apart radially from the internal diameter of the thrust runner 400, the first ends 411 of the grooves 410, which are formed on the thrust runner 400, are disposed between the internal diameter of the thrust runner 400 and the top foils 330 of the foil thrust bearings 300 and may be open as inlets. Also, the grooves 410, which are formed on the front and rear surfaces of the thrust runner 400, may be formed to extend to the external diameter of the thrust runner 400 and may thus form openings 412 along the circumference surface of the thrust runner 400. The cooling gas may be released to the outside of the thrust runner 400 through the openings 412.

Referring to FIGS. 12 and 13, the top foils 330 of the foil thrust bearings 300 may be installed near the internal diameter of a thrust runner 600. In this case, stepped portions may be additionally provided on the front and rear surfaces of the thrust runner 400 to form inlets at first ends 611 of grooves 610 on the side of the internal diameter of the thrust runner 600. The grooves 610 may extend to the sides of the stepped portions so that openings 611 for receiving the cooling gas can be secured at the stepped portions.

As described above, because the openings (411 and 412 or 611 and 612) are formed at both ends of each of the grooves 410 or 610, a smooth flow of the cooling gas can be secured, and more air can be induced to the rear of the impeller 200. As a result, the cooling effect of a rotating body can be improved, and the compression efficiency of a turbo device can be reduced. Accordingly, the shape and size of the grooves 410 or 610 and the size of the openings (411 and 412 or 611 and 612) need to be appropriately designed in consideration of the rotation speed of the shaft 100 and heating temperature.

In the aforementioned thrust supporting apparatus, the grooves 410, which are for securing the cooling gas in the thrust runner 400, are formed. Therefore, the overheating of a rotating body can be prevented without the installation of additional cooling equipment.

While exemplary embodiments have been described above, it will be understood by those of ordinary skill in the art that various changes in form and details may be made therein without departing from the spirit and scope of the disclosure as defined by the following claims.

What is claimed is:

1. A thrust supporting apparatus comprising:
a thrust runner configured to rotate integrally with a shaft; and
a foil thrust bearing supporting an axial load of the shaft, the axial load being transmitted from the thrust runner, wherein:
the foil thrust bearing includes a top foil facing a first surface of the thrust runner, and
the thrust runner comprises at least one stepped portion provided at the first surface of the thrust runner,
the thrust runner further comprises first one or more grooves formed on the first surface,
first ends of the first one or more grooves are disposed on the at least one stepped portion, and
the first ends of the first one or more grooves include first openings provided at a side of the at least one stepped portion.

2. The thrust supporting apparatus of claim 1, wherein the first one or more grooves are formed as spirals.

3. The thrust supporting apparatus of claim 2, wherein the first one or more grooves extend from a radially inner side of the thrust runner to a radially outer side of the thrust runner, and are curved from the radially inner side to the radially outer side of the thrust runner in an opposite direction of a rotational direction of the thrust runner.

4. The thrust supporting apparatus of claim 1, wherein the first one or more grooves are formed as straight lines that extend from a radially inner side of the thrust runner to a radially outer side of the thrust runner.

5. The thrust supporting apparatus of claim 4, wherein the first one or more grooves, that are formed as the straight lines, extend along a radial direction of the thrust runner in a direction opposite to a rotational direction of the thrust runner.

6. The thrust supporting apparatus of claim 1, further comprising an additional foil thrust bearing,
wherein:
the additional foil thrust bearing includes a top foil disposed to a second surface opposite to the first surface of the thrust runner in an axial direction of the shaft,
the second surface comprises second one or more grooves formed on the second surface of the thrust runner, and
first extending directions of the first one or more grooves formed on the first surface of the thrust runner match second extending directions of the second one or more grooves formed on the second surface of the thrust runner.

7. The thrust supporting apparatus of claim 1, wherein a cross section of each of the first one or more grooves has at least one of a semicircular shape, a square shape, and a triangular shape.

8. The thrust supporting apparatus of claim 1, wherein second ends of the first one or more grooves include second openings that are opposite to the first ends and do not overlap with the top foil.

9. The thrust supporting apparatus of claim 8, wherein:
the top foil is provided a predetermined distance apart radially from an internal diameter of the thrust runner.

10. The thrust supporting apparatus of claim 8, wherein the first one or more grooves extend to an outer diameter of the thrust runner so that outer ends of the first one or more grooves are disposed on an outer circumferential surface of the thrust runner.

11. A thrust supporting apparatus comprising:
a thrust runner configured to rotate integrally with a shaft and comprising:
a first surface facing an impeller; and
a second surface opposite to the first surface of the thrust runner;
foil thrust bearings supporting an axial load of the shaft being transmitted through the thrust runner and comprising:
a first foil thrust bearing including a first top foil facing the first surface; and
a second foil thrust bearing including a second top foil facing the second surface;
wherein the thrust runner further comprises:
at least one stepped portion provided at the first surface of the thrust runner;
first grooves formed on the first surface; and
second grooves formed on the second surface, and
wherein first ends of the first grooves are disposed on the at least one stepped portion, and
the first ends of the first grooves include first openings provided at a side of the at least one stepped portion.

12. The thrust supporting apparatus of claim 11, wherein the first grooves and the second grooves extend from a radially inner side of the thrust runner to a radially outer side of the thrust runner, and are curved from the radially inner side to the radially outer side of the thrust runner in an opposite direction of a rotational direction of the thrust runner.

13. The thrust supporting apparatus of claim 11, wherein the first grooves and the second grooves extend in straight lines that extend from a radially inner side of the thrust runner to a radially outer side of the thrust runner, such that the first grooves and the second grooves extend in a radial direction of the shaft in an opposite direction of a rotational direction of the thrust runner.

14. The thrust supporting apparatus of claim 11, wherein a cross section of each of the first grooves and each of second grooves has at least one of a semicircular shape, a square shape, and a triangular shape.

* * * * *